United States Patent
Lee et al.

(10) Patent No.: US 12,469,578 B2
(45) Date of Patent: Nov. 11, 2025

(54) PHASE-CHANGE MEMORY CONTROLLER CAPABLE OF REDUCING WRITE POWER AND PHASE-CHANGE MEMORY SYSTEM INCLUDING SAME

(71) Applicant: SK hynix Inc., Icheon-si (KR)

(72) Inventors: Dong Sop Lee, Icheon-si (KR); Tae Ho Lim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 99 days.

(21) Appl. No.: 18/490,685

(22) Filed: Oct. 19, 2023

(65) Prior Publication Data
US 2024/0339171 A1    Oct. 10, 2024

(30) Foreign Application Priority Data

Apr. 4, 2023  (KR) .......... 10-2023-0044411

(51) Int. Cl.
*G11C 29/52*  (2006.01)
*H03M 13/00*  (2006.01)
*H03M 13/11*  (2006.01)

(52) U.S. Cl.
CPC ............. *G11C 29/52* (2013.01); *H03M 13/11* (2013.01); *H03M 13/611* (2013.01)

(58) Field of Classification Search
CPC ...... G06F 12/00; G06F 12/02; G06F 11/1008; G06F 12/0238; G06F 11/10; G11C 29/52; H03M 13/11; H03M 13/611
USPC .................................. 711/103; 714/758, 773
See application file for complete search history.

(56) References Cited

U.S. PATENT DOCUMENTS

| | | | |
|---|---|---|---|
| 8,848,465 B2 * | 9/2014 | Kim ........................ | G11C 7/02 365/220 |
| 9,135,994 B2 * | 9/2015 | Kwon ................ | G11C 13/0061 |
| 9,779,813 B2 * | 10/2017 | Lung ................. | G11C 13/0061 |
| 10,037,799 B2 * | 7/2018 | Chu ..................... | G11C 13/0069 |
| 10,521,293 B2 * | 12/2019 | Cha ..................... | G06F 11/1072 |
| 10,541,009 B2 * | 1/2020 | Zimmerman ........... | G06F 3/061 |
| 2007/0255891 A1 * | 11/2007 | Chow .................... | G06F 13/161 711/103 |
| 2010/0214828 A1 * | 8/2010 | Hanzawa ............. | G11C 13/004 365/163 |
| 2011/0320915 A1 * | 12/2011 | Khan .................. | H03M 13/353 714/763 |

(Continued)

OTHER PUBLICATIONS

A. Jadidi, M. Arjomand, M. K. Tavana, D. R. Kaeli, M. T. Kandemir and C. R. Das, "Exploring the Potential for Collaborative Data Compression and Hard-Error Tolerance in PCM Memories," 2017 47th Annual IEEE/IFIP International Conference on Dependable Systems and Networks (DSN), Denver, CO, USA, 2017 (Year: 2017).*

*Primary Examiner* — Albert Decady
*Assistant Examiner* — Grace V Braden
(74) *Attorney, Agent, or Firm* — Perkins Coie LLP

(57) ABSTRACT

A phase-change memory controller controls a phase-change memory device. The phase-change memory controller includes a write control circuit configured to receive first write data of "N" bits (where "N" is a natural number greater than 2) to be written to the phase-change memory device to generate second write data composed of compressed data compressed with "M" bits (where "N" is a natural number smaller than "N") and "0" padding data in which the rest "N-M" bits are filled with "0".

19 Claims, 12 Drawing Sheets

(56) References Cited

U.S. PATENT DOCUMENTS

| | | | |
|---|---|---|---|
| 2012/0173955 A1* | 7/2012 | Liang | G06F 11/1048 |
| | | | 714/773 |
| 2013/0007346 A1 | 1/2013 | Khan | |
| 2015/0067436 A1* | 3/2015 | Hu | G06F 12/0238 |
| | | | 714/758 |
| 2017/0147213 A1* | 5/2017 | Amidi | G06F 3/0673 |
| 2020/0341685 A1 | 10/2020 | Sharon et al. | |

* cited by examiner

PHASE-CHANGE MEMORY CONTROLLER CAPABLE OF REDUCING WRITE POWER AND PHASE-CHANGE MEMORY SYSTEM INCLUDING SAME

PRIORITY CLAIM AND CROSS-REFERENCE TO RELATED APPLICATIONS

This patent document claims the priority and benefits of Korean Patent Application No. 10-2023-0044411, filed on Apr. 4, 2023, which is incorporated herein by reference in its entirety.

TECHNICAL FIELD

Embodiments of the present disclosure relate to nonvolatile memory controllers and nonvolatile memory systems including the same.

BACKGROUND

A phase-change memory (PCM) device stores values using changes in physical characteristics of materials. The state of a cell of the PCM device may be changed into a crystalline state or an amorphous state. In each state, the cell of the PCM device has a specific electrical resistance and stores "0" and "1" using the electrical resistance.

SUMMARY

A phase-change memory controller according to an embodiment of the present disclosure may control a phase-change memory device.

In one aspect, a phase-change memory controller may include a write control circuit configured to receive first write data of "N" bits (where "N" is a natural number greater than 2) to be written to the phase-change memory device to generate second write data composed of compressed data compressed with "M" bits (where "N" is a natural number smaller than "N") and "0" padding data in which the rest "N-M" bits are filled with "0".

In another aspect, a phase-change memory controller is provided to include a write control circuit configured to 1) receive first write data to be written to the phase-change memory device and having a first number of bits, the first number being a natural number greater than 2, and 2) generate second write data including compressed data obtained by compressing the first write data to a second number of bits, the second number being a natural number smaller than the first number, the second write data further including padding data that has a size corresponding to a difference between the first number and the second number and a predetermined value.

In another aspect, a phase-change memory system may include a phase-change memory device, and a phase-change memory controller configured to control the phase-change memory device. The phase-change memory controller may include a write control circuit configured to receive first write data of "N" bits ("N" is a natural number greater than 2) to be written to the phase-change memory device to generate second write data composed of compressed data compressed with "M" bits ("M" is a natural number smaller than "N") and "0" padding data in which the rest "N-M" bits are filled with "0".

In another aspect, a phase-change memory system is provided to include a phase-change memory device; and a phase-change memory controller communicatively coupled with the phase-change memory device and configured to control the phase-change memory device, wherein the phase-change memory controller includes a write control circuit configured to 1) receive first write data to be written to the phase-change memory device and having a first number of bits, the first number being a natural number greater than 2, and 2) generate second write data including compressed data obtained by compressing the first write data to a second number of bits, the second number being a natural number smaller than the first number, the second write data further including padding data that has a size corresponding to a difference between the first number and the second number and a predetermined value.

DETAILED DESCRIPTION

In the description of the embodiments of the present disclosure, descriptions such as "first" and "second" are for distinguishing elements, and are not used to limit the members themselves or to mean a specific order. The description that one component is "connected" or "coupled" to another component may be electrically or mechanically directly connected or connected to another component. Alternatively, other separate components may be interposed in the middle to form a connection relationship or a connection relationship. The term "predetermined" means that the value of a parameter is predetermined when using that parameter in a process or algorithm. The value of the parameter may be set when a process or algorithm starts or may be set during a period during which a process or algorithm is performed, depending on embodiments.

"Logic high level" and "logic low level" are used to describe different logic levels of signals. A signal having a "logic high level" is distinguished from a signal having a "logic low level". For example, when a signal having a first voltage corresponds to a "logic high level", a signal having a second voltage may correspond to a "logic low level". According to an embodiment, the "logic high level" may be set to a higher voltage than the "logic low level". Meanwhile, the logic levels of the signals may be set to other logic levels or opposite logic levels according to embodiments. For example, a signal having a logic high level may be set to have a logic low level according to embodiments, and a signal having a logic low level may be set to have a logic high level according to embodiments.

Hereinafter, various implementations of the disclosed technology will be described with reference to the drawings.

Figure 1:
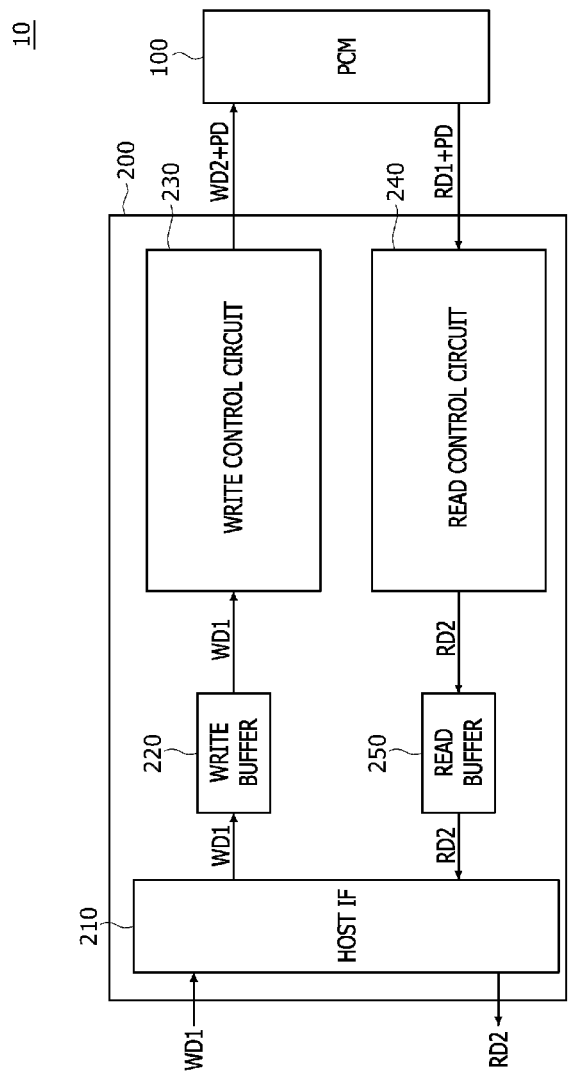
FIG. 1 is an example of a block diagram illustrating a phase-change memory system based on some implementations of the disclosed technology.

FIG. 1 is a block diagram illustrating a phase-change memory system 10 according to an embodiment of the present disclosure. Referring to FIG. 1, the phase-change memory system 10 may include a phase-change memory (PCM) device 100 and a phase-change memory controller 200 for controlling the phase-change memory device 100.

The PCM device 100 may include a phase-change memory cell array in which a plurality of phase-change memory cells is arranged in the form of an array. The phase-change memory cells included in the phase-change memory cell array may be formed of or include a phase-change material. The phase-change material may include a chalcogenide material whose resistance is changed by being switched between a crystalline state and an amorphous state depending on a temperature change. In an embodiment, the chalcogenide material may be or include an alloy of two or more of germanium (Ge), antimony (Sb), or tellurium (T2). When the alloy is heated above its melting point and then rapidly cooled, the alloy becomes in an amorphous state. On the other hand, when the alloy in an amorphous state is heated to a temperature between the crystallization temperature and the melting point and then slowly cooled, the alloy is converted into a crystalline state. Such heating may be provided by passing an electric current through the alloy. The status change can occur rapidly. For example, the status change takes approximately 5 nanoseconds.

In an embodiment, the phase-change memory cell may include an alloy resistor in a crystalline state and a selection transistor disposed in series between a bit line and a ground. When the alloy resistor is in a crystalline state, the alloy resistor may have a relatively low resistivity, and in this case, the alloy resistor may exhibit a logic "high" level (or "1"). When a high current is applied to the alloy resistor in a crystalline state, the crystalline phase of the alloy resistor may be converted. Specifically, the high current may generate resistive heating in the alloy resistor, and as a result, when the melting temperature is reached, the alloy resistor may be melted from the crystalline state to a liquid state. When the alloy resistor is rapidly cooled by stopping supply of current, the alloy resistor is solidified in an amorphous state because crystals do not have time to grow during cooling. When the alloy resistor is in an amorphous state, if the alloy resistor has a relatively high resistivity, in this case, the alloy resistor may exhibit a logic "low" level (for example, "0"). When a low current is applied to the alloy resistor in an amorphous state for a long time, the temperature of the alloy resistor may reach or exceed the crystallization temperature. With the low current applied to the alloy resister, there is not enough current to reach a higher melting temperature. Thus, the alloy resistor in the amorphous state may begin to be crystallized over a long period of time.

With a physical state change, the PCM device has different power consumption and operating time during a read operation and a write operation. During the read operation, only a very small amount of power is consumed and the read operation can be performed quickly, whereas during the write operation, a lot of power and time are consumed. Due to the characteristics of the PCM device, energy consumed in the PCM device can be reduced by reducing the number of write operation.

A write operation for the phase-change memory cell may include a set operation and a reset operation. When the set operation is performed on the phase-change memory cell, the alloy resistor of the phase-change memory cell may be converted from an amorphous state to a crystalline state, and a logic level of the phase-change memory cell may be changed from a logic "high" level (e.g., "1") to a logic "low" level (e.g., "0"). When the reset operation is performed on the phase-change memory cell, the alloy resistor of the phase-change memory cell may be converted from a crystalline state to an amorphous state, and the logic level of the phase-change memory cell may be changed from a logic "low" level (e.g., "0") to a logic "high" level (e.g., "1"). The set operation on the phase-change memory cell may be performed by supplying a high current to the alloy resistor of the phase-change memory cell for a relatively short time. On the other hand, the reset operation on the phase-change memory cell may be performed by supplying a low current to the alloy resistor of the phase-change memory cell for a relatively long time. Accordingly, the amounts of power consumed during the set operation and reset operation of the phase-change memory cell may be different. In general, the amount of power consumed by the set operation that changes the logic level from a logic "high" level (e.g., "1") to a logic "low" level (e.g., "0") may be relatively greater than the amount of power consumed in the reset operation that changes the logic level from a logic "low" level (e.g., "0") to a logic "high" level (e.g., "1"). Accordingly, in the process of performing the write operation on the phase-change memory device 100, as the number of reset operations is reduced, the power consumed for the writing operation of the phase-change memory device 100 may be reduced.

The phase-change memory controller 200 may include a host interface 210, a write buffer 220, a write control circuit 230, a read control circuit 240, and a read buffer 250. The host interface 210 may operate as an interface for exchanging data between the phase-change memory controller 200 and an external device, e.g., a host. For example, when the host transmits write data WD1, the write data WD1 may be received by the write buffer 220 from the host through the host interface 210. In addition, when the phase-change memory controller 200 transmits read data RD2 to the host, the read data RD2 may be transmitted to the host from the read buffer 250 through the host interface 210. In an embodiment, the host interface 210 may include a compute express link (CXL) interface. Hereinafter, the write data WD1 and the read data RD2 that are through the host interface 210 will be referred to as "first write data WD1" and "second read data RD2", respectively.

The write buffer 220 may temporarily store or buffer the first write data WD1 transmitted from the host interface 210 to transmit the first write data WD1 to the write control circuit 230. The write control circuit 230 may perform a compression operation, a padding operation, and an encoding operation on the first write data WD1 transmitted from the write buffer 220 to generate second write data WD2 and parity data PD. For example, the write control circuit 230 may perform the encoding operation based on an error correction code (ECC). The write control circuit 230 may generate compressed data having a smaller number of bits than the number of bits of the first write data WD1 through the compression operation. Thus, after the compression operation, there are a number of remaining bits corresponding to the number of differences between the sizes of the first write data WD1 and the compressed data. The write control circuit 230 may perform the padding operation on the remaining bits to generate padding data. In some implementations, the write control circuit 230 may write the remaining bits of the first write data WD1, which are not occupied by the compressed data, a specific data, e.g., "0". Although the write control circuit 230 writes the data "0" to the remaining bits of the first write data WD1 after the compression operation, other implementations are also possible without being limited to "0." The write control circuit 230 may output the compressed data and the padding data as the second write data WD2. The write control circuit 230 may perform the ECC encoding operation on the second write data WD2 to generate the parity data PD. The write control circuit 230 may output and transmit the second write data WD2 and the parity data PD to the phase-change memory device 100. The write control circuit 230 will be described in more detail below.

The read control circuit 240 may receive the first read data RD1 and the parity data PD from the phase-change memory device 100. The read control circuit 240 may perform an ECC decoding operation. Thus, the read control circuit 240 may perform an error correction operation on the first read data RD1 using the parity data PD to generate error-corrected first read data. The read control circuit 240 may perform a decompression operation on the error-corrected first read data to generate and output the second read data RD2. The read control circuit 240 may transmit the second read data RD2 to the read buffer 250. The read buffer 250 may temporarily store or buffer the second read data RD2 transmitted from the read control circuit 240 to transmit the buffered second read data to the host interface 210.

Figure 2:
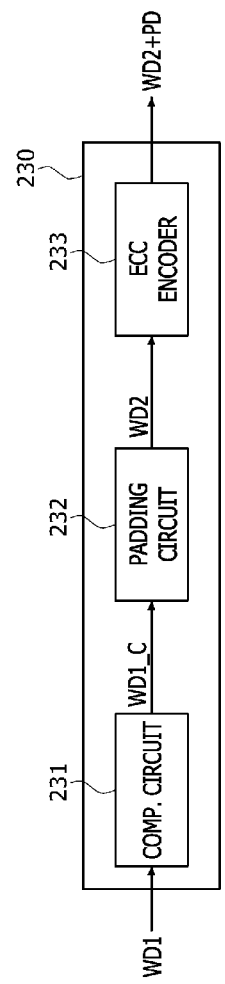
FIG. 2 is an example of a block diagram illustrating a write control circuit included in a phase-change memory controller of FIG. 1.
Figure 3:
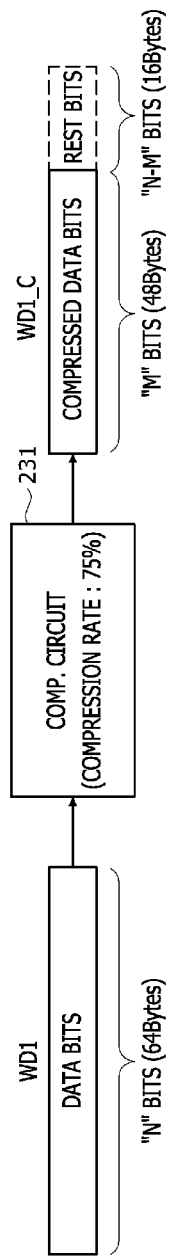
FIG. 3 is an example of a diagram illustrating an operation of a compression circuit included in a write control circuit of FIG. 2.
Figure 4:
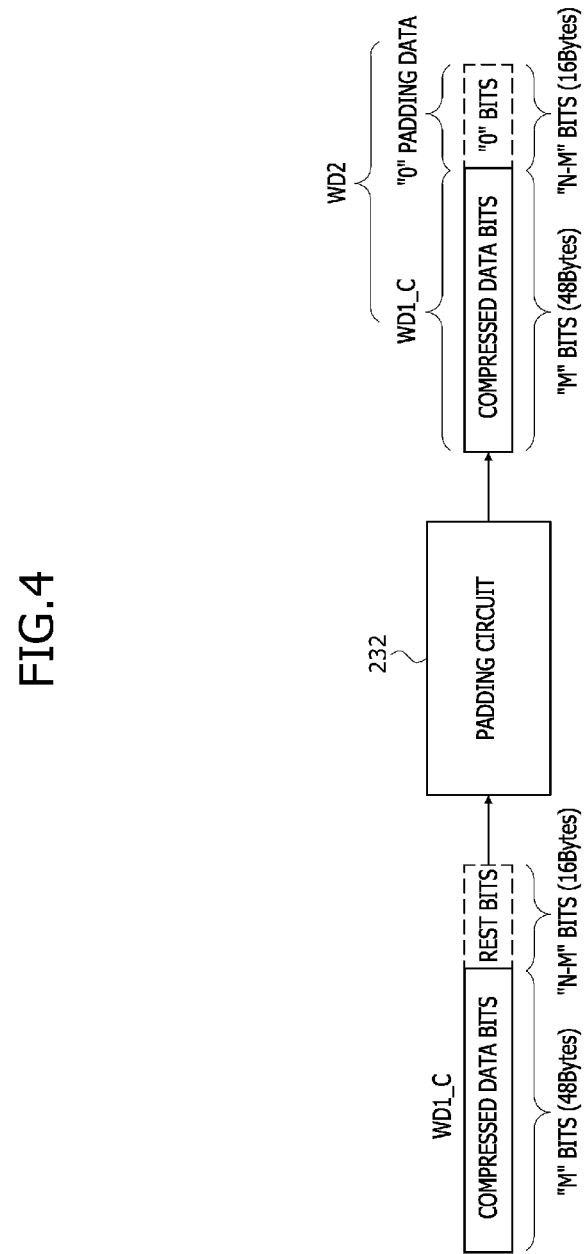
FIG. 4 is an example of a diagram illustrating an operation of a padding circuit included in a write control circuit of FIG. 2.

FIG. 2 is a block diagram illustrating the write control circuit 230 included in the phase-change memory controller 200 of FIG. 1. FIG. 3 is a diagram illustrating an operation of a compression circuit 231 included in the write control circuit 230 of FIG. 2. In addition, FIG. 4 is a diagram illustrating an operation of a padding circuit 232 included in the write control circuit 230 of FIG. 2.

Referring to FIG. 2, the write control circuit 230 may include the compression circuit 231, the padding circuit 232, and an ECC encoder 233. The compression circuit 231 may receive the first write data WD1 transmitted from the write buffer (220 of FIG. 1). In an embodiment, the first write data WD1 may include a binary steam of "N" bits ("N" is a natural number greater than or equal to 2). The compression circuit 231 may compress the first write data WD1 to generate and output compressed data WD1_C having a size of "M" bits ("M" is a natural number smaller than "N"). In some implementations, the number of bits of the compressed data WD1_C may be determined by a compression rate of the compression circuit 231.

FIG. 3 illustrates an example of a data compression operation based on some implementations of the disclosed technology. In the example as shown in FIG. 3, the number of bits "N" of the first write data WD1 is 64 bytes and the compression rate of the compression circuit 231 is 75%. In this case, the first write data WD1 may include data bits having a size of 64 bytes. The compression circuit 231 may perform a compression operation on the first write data WD1 to generate 48-byte compressed data WD1_C corresponding to 75% of the total number of bits of the first write data WD1. Thus, the compressed data WD1_C may include compressed data bits of 48 bytes. The rest bits obtained by subtracting the number of bits of the compressed data WD1_C from the number of bits of the first write data WD1, i.e., 16 bytes, do not include any data, which are indicated by dotted lines in FIG. 3.

Referring to FIG. 2 again, the padding circuit 232 may receive the compressed data WD1_C output from the compression circuit 231. The padding circuit 232 may perform a padding operation on the compressed data WD1_C to generate padding data. The padding circuit 232 may output the compressed data and the padding data as the second write data WD2. All bits of the padding data generated by the padding circuit 232 may have a value of "0".

FIG. 4 illustrates an example of a data padding operation based on some implementations of the disclosed technology. In the example as shown in FIG. 4, the padding circuit 232 may receive the compressed data WD1_C consisting of 48 bytes of compressed data bits and generate padding data by writing "0" to the bits of the rest bytes of 16 bytes (i.e., 128 bits). The padding operation does not make any changes to the compressed data and thus the compressed data bits remain the same. The padding circuit 232 may configure the second write data WD2 by including the padding data and the compressed data WD1_C and output the second write data WD2 The process of configuring of the second write data WD2 may include adding the padding data to the compressed data WD1_C such that a most significant bit of the padding data becomes a lower bit of a least significant bit of the compressed data WD1_C.

Referring to FIG. 2, the second write data WD2 output from the padding circuit 232 may be transmitted to the ECC encoder 233. The ECC encoder 233 may perform an ECC encoding on the second write data WD2 to generate the parity data PD. The ECC encoder 233 may output the second write data WD2 and parity data PD (WD2+PD). The ECC encoder 233 may perform the ECC encoding by applying various algorithms. In an example, the ECC encoder 233 may apply an algorithm such as a Hamming code, a Reed-Solomon code, or a BCH code. Although the ECC encoder 233 is described, other implementations are also possible. For example, the phase-change memory controller may include an encoder performing an encoding operation using other encoding techniques than the error correction code.

Figure 5:
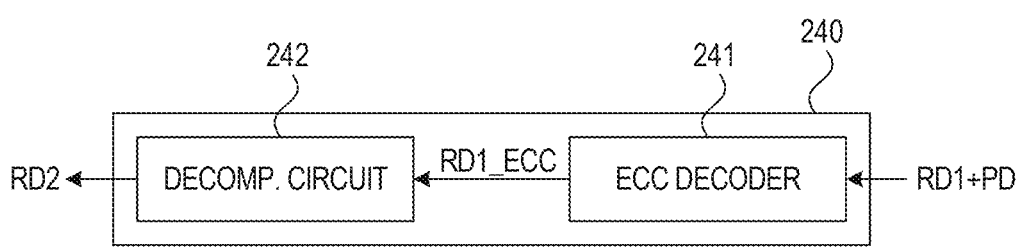
FIG. 5 is an example of a block diagram illustrating a read control circuit included in a phase-change memory controller of FIG. 1.
Figure 6:
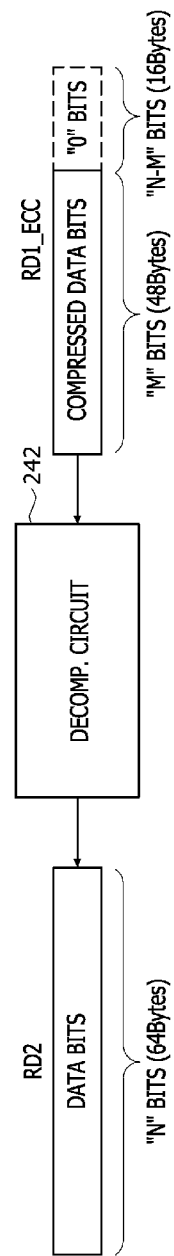
FIG. 6 is an example of a diagram illustrating an operation of a decompression circuit included in the read control circuit of FIG. 5.

FIG. 5 is a block diagram illustrating the read control circuit 240 included in the phase-change memory controller 200 of FIG. 1. FIG. 6 is a diagram illustrating an operation of a decompression circuit 242 included in the read control circuit 240 of FIG. 5.

Referring to FIG. 5, the read control circuit 240 may include an ECC decoder 241, and the decompression circuit 242. The ECC decoder 241 may receive the first read data RD1 and the parity data PD (RD1+PD) read from the phase-change memory device (100 of FIG. 1). The ECC decoder 241 may perform an ECC decoding operation on the first read data RD1 using the parity data PD. The ECC decoding operation may include an error detection operation and an error correction operation. Thus, the ECC decoder 241 may perform the error detection operation of determining whether an error exists in the first read data RD1 using the parity data PD. When it is determined that an error exists in the first read data RD1, the ECC decoder 241 may perform an error correction operation to correct the error and output error-corrected first read data RD1_ECC. When there is no error in the first read data RD1, the ECC decoder 241 may output the first read data RD1 as the error-corrected first read data RD1_ECC. The decompression circuit 242 may decompress the error-corrected first read data RD1, and output a decompression result as the second read data RD2. Although the ECC decoder 241 is described, other implementations are also possible. For example, the phase-change memory controller may include a decoder performing a decoding operation using other decoding techniques than the error correction code.

In the example as shown in FIG. 6, the error-corrected first read data RD1_ECC transmitted from the ECC decoder (241 of FIG. 5) to the decompression circuit 242 may be composed of compressed data bits of 48 bytes and "0" bits of 16 bytes. The decompression circuit 242 may decompress the compressed data bits of 48 bytes constituting the error-corrected first read data RD1_ECC to generate and output the second read data RD2 composed of data bits of 64 bytes. During the decompression process in the decompression circuit 242, all "0" bits of 16 bytes may be removed and replaced with data bits of 16 bytes generated during the decompression process.

Figure 7:
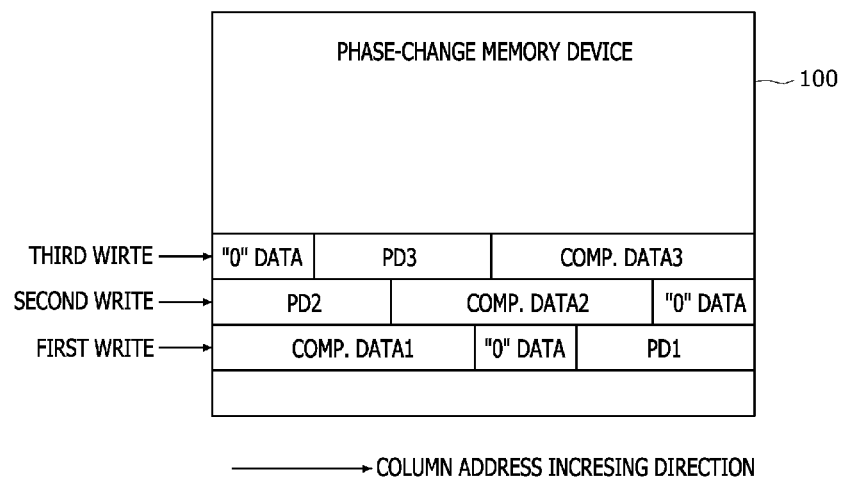
FIG. 7 is an example of a diagram illustrating a method of storing write data in a phase-change memory device by a write operation in the phase-change memory system of FIG. 1.

FIG. 7 is a diagram illustrating a method of storing write data in the phase-change memory device 100 of FIG. 1 by a write operation in the phase-change memory system 10 of FIG. 1. In the present embodiment, a case in which 64 bytes of data are stored in the phase-change memory device 100 will be taken as an example. Although three rows are shown in FIG. 7, this is the example only, and the data can be written to occupy N number of rows without being limited to three (N is a natural number).

Referring to FIG. 7, by a first write operation, first compressed data (COMP. DATA1), padding data ("0" DATA), and first parity data (PD1) may be sequentially stored in a row of the phase-change memory device 100 along a direction in which column address increases, as indicated by arrows in FIG. 7. Next, in a second write operation, the order of data may be changed, and second parity data (PD2) and second compressed data (COMP. DATA2) may be sequentially stored in the row of the phase-change memory device 100 along a direction in which the column address increases. Next, in a third write operation, the order of data may be changed, and "0" padding data ("0" DATA), third parity data (PD3), and third compressed data (COMP. DATA3) may be sequentially stored in the row of the phase-change memory device 100 along a direction in which the column address increases.

In this way, whenever a write operation is performed on the phase-change memory device 100, the order of the compressed data, the padding data, and the parity data may be changed. Accordingly, a data toggle probability in a row area of the phase-change memory device 100, that is, the probability that a value changes from "0" to "1", or vice versa, from "1" to "0" may be uniform. The order of the compressed data, the padding data, and the parity data as shown in FIG. 7 is an example only. In some implementations, regardless of the type of data, a shifting method may be applied in units of certain bits along the direction in which the column address increases. Whenever the write operation is performed on the phase-change memory device 100, the operation of changing the order of the compressed data, the padding data, and the parity data may be performed. In some implementations, the order of the compressed data, the padding data, and the parity data can be changed by adjusting the address transmitted to the phase-change memory device 100 whenever the phase-change memory controller 200 performs the write operation. Alternatively, whenever the write operation is performed on the phase-change memory device 100, the operation of changing the order of the compressed data, the padding data, and the parity data may be performed by changing connection between data and data input/output DQ terminals. Such changing the connection between data and data input/output DQ terminals may occur whenever the write operation is performed in the phase-change memory controller 200.

Figure 8:
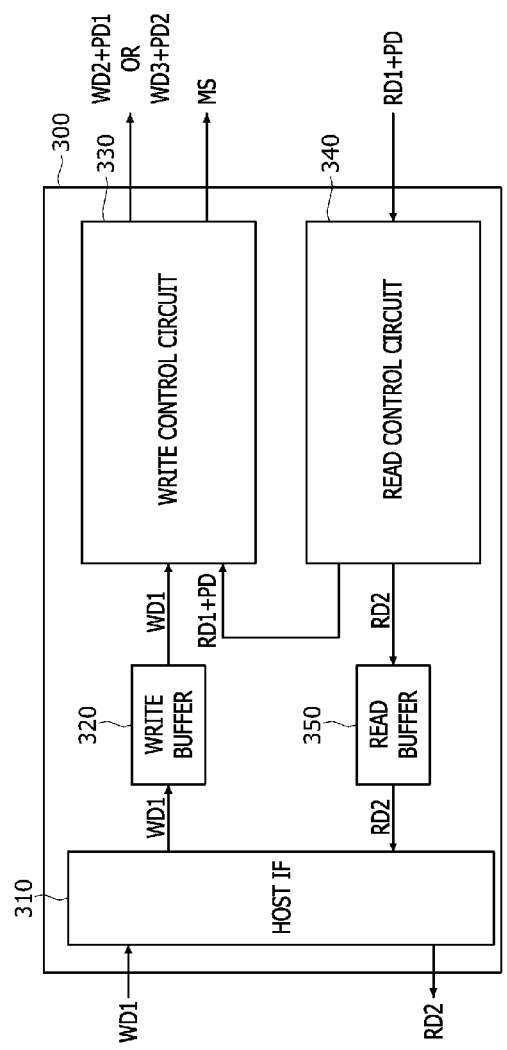
FIG. 8 is an example of a block diagram illustrating another embodiment of a phase-change memory controller included in the phase-change memory system of FIG. 1.

FIG. 8 is a block diagram illustrating another embodiment of a phase-change memory controller included in the phase-change memory system 10 of FIG. 1. The phase-change memory controller 300 according to the present embodiment may be different from the phase-change memory controller 200 described above with reference to FIG. 2 in that the write operations may be performed in normal mode and read-modifying-write (hereinafter, RMW) mode.

Referring to FIG. 8, the phase-change memory controller 300 may include a host interface 310, a write buffer 320, a write control circuit 330, a read control circuit 340, and a read buffer 350. The host interface 310, the write buffer 320, and the read buffer 350 may be configured the same as the host interface 210, the write buffer 220, and the read buffer 250 of the phase-change memory controller 200 described above with reference to FIG. 1, and accordingly, a detailed description thereof will be omitted below.

The write control circuit 330 may receive first write data WD1 from the write buffer 320, and receive first read data RD1 and parity data PD through the read control circuit 340. When the phase-change memory controller 300 performs a write operation in a normal mode, the write control circuit 330 may generate and output second write data WD2 and first parity data PD1, based on the first write data WD1. On the other hand, when the phase-change memory controller 300 performs a write operation in an RMW mode, the write control circuit 330 may generate and output third write data WD3 and second parity data PD2, based on the first write data WD1, and the first read data RD1 and parity data PD transmitted from the read control circuit 340. The write control circuit 330 may generate and output a masking signal MS during the write operation in the RMW mode.

The read control circuit 340 may receive the first read data RD1 and the parity data PD from the phase-change memory device (100 of FIG. 1). When the phase-change memory controller 300 operates in the normal mode, the read control circuit 340 may generate and output second read data RD2 obtained through ECC decoding and decompression based on the first read data RD1 and the parity data PD. The read control circuit 340 may transmit the second read data RD2 to the read buffer 350. On the other hand, when the phase-change memory controller 300 operates in the RMW mode, the read control circuit 340 may transmit the first read data RD1 and the parity data PD to the write control circuit 330 without modification.

Figure 9:
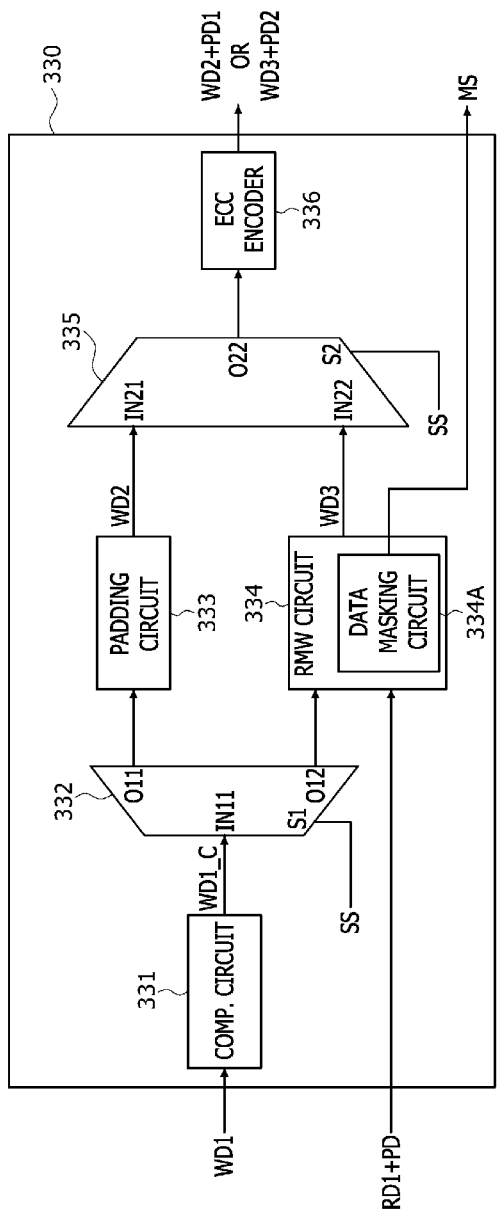
FIG. 9 is an example of a circuit diagram illustrating a write control circuit included in the phase-change memory controller of FIG. 8.

FIG. 9 is a circuit diagram illustrating the write control circuit 330 included in the phase-change memory controller 300 of FIG. 8.

Referring to FIG. 9, the write control circuit 330 may include a compression circuit 331, a multiplexer 332, a padding circuit 333, an RMW circuit 334, a demultiplexer 335, and an ECC encoder 336. The compression circuit 331 and the padding circuit 333 of the write control circuit 330 may be configured the same as the compression circuit 231 and the padding circuit 232 of the write control circuit 230 included in the phase-change memory controller 200 of FIG. 2, and accordingly, redundant descriptions will be omitted below.

The multiplexer 332 may have an input terminal IN11, a selection terminal S1, a first output terminal O11, and a second output terminal O12. The multiplexer 332 may receive the compressed data WD1_C output from the compression circuit 331 through the input terminal IN11. The multiplexer 332 may receive a selection signal SS through the selection terminal S1. The selection signal SS may have a first logic level, for example, a value of "0" when the phase-change memory controller 300 operates in the normal mode. On the other hand, when the phase-change memory controller 300 operates in the RMW mode, the selection signal SS may have a second logic level, for example, a value of "1". The multiplexer 332 may output the compressed data WD1_C through the first output terminal O11 or the second output terminal O12 according to the logic level of the selection signal SS. For example, when the selection signal SS is "0", the multiplexer 332 may output the compressed data WD1_C through the first output terminal O11. On the other hand, when the selection signal SS is "1", the multiplexer 332 may output the compressed data WD1_C through the second output terminal O12. The compressed data WD1_C output through the first output terminal O11 of the multiplexer 332 may be transmitted to the padding circuit 333. The compressed data WD1_C output through the second output terminal O12 of the multiplexer 332 may be transmitted to the RMW circuit 334.

The RMW circuit 334 may receive the compressed data WD1_C output from the second output terminal O12 of the multiplexer 332. In addition, the RMW circuit 334 may receive the first read data RD1 and the parity data PD that are output from the read control circuit (340 of FIG. 8). The RMW circuit 334 may output the third write data WD3 in which a part of the first read data RD1 is replaced with the compressed data WD1_C. In addition, the RMW circuit 334 may output the masking signal MS. The masking signal MS may represent non-toggle bits whose values are not modified, among the bits of the first read data RD1. For generating the masking signal MS, the RMW circuit 334 may include a data masking circuit 334A.

The demultiplexer 335 may have a first input terminal IN21, a second input terminal IN22, a selection terminal S2, and an output terminal O22. The demultiplexer 335 may receive the second write data WD2 output from the padding circuit 333 through the first input terminal IN21. The demultiplexer 335 may receive the third write data WD3 output from the RMW circuit 334 through the second input terminal IN22. The demultiplexer 335 may receive the selection signal SS through the selection terminal S2. The demultiplexer 335 may output the second write data WD2 or the third write data WD3 through the output terminal O22 according to the logic level of the selection signal SS. For example, when the selection signal SS is "0" (i.e., in a case of the normal mode), the demultiplexer 335 may output the second write data WD2 input through the first input terminal IN21 through the output terminal O22. On the other hand, when the selection signal SS is "1" (i.e., in a case of the RMW mode), the demultiplexer 335 may output the third write data WD3 input through the second input terminal IN22 through the output terminal O22. The second write data WD2 or the third write data WD3 output from the demultiplexer 335 may be transmitted to the ECC encoder 336.

The ECC encoder 336 may perform ECC encoding on the second write data WD2 or the third write data WD3 to generate the first parity PD1 or the second parity PD2. For example, when the second write data WD2 is transmitted from the demultiplexer 335, like the ECC encoder (233 in FIG. 2) described with reference to FIG. 2, the ECC encoder 336 may output the second write data WD2 and first parity data PD1 (WD2+PD1). The first parity data PD1 may be generated through the ECC encoding on the second write data WD2. On the other hand, when the third write data WD3 is transmitted from the demultiplexer 335, the ECC encoder 336 may output the third write data WD3 and second parity data PD2 (WD3+PD2). The second parity data PD2 may be generated through ECC encoding on the third write data WD3.

Figure 10:
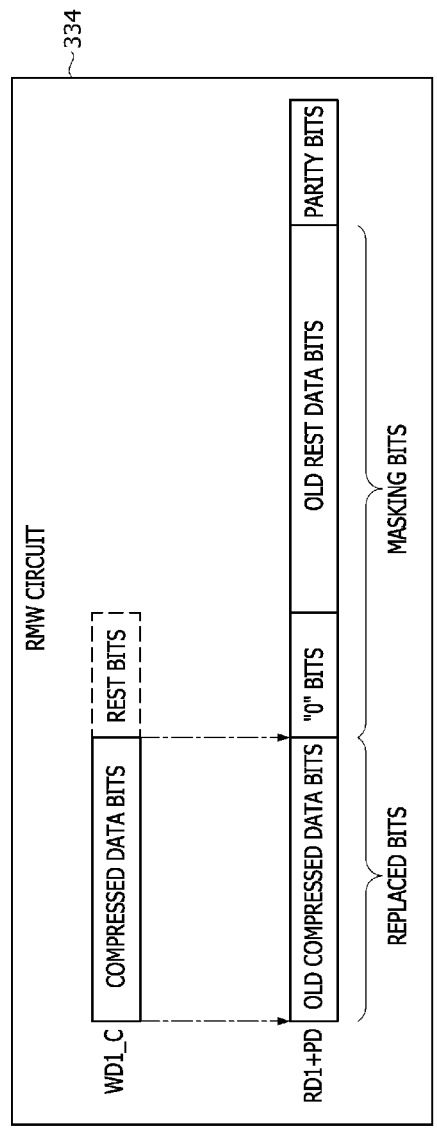
FIG. 10 is an example of a diagram illustrating bit configurations of compressed data, first read data, and parity data transmitted to a read-modify-write (RMW) circuit included in the write control circuit of FIG. 9.
Figure 11:
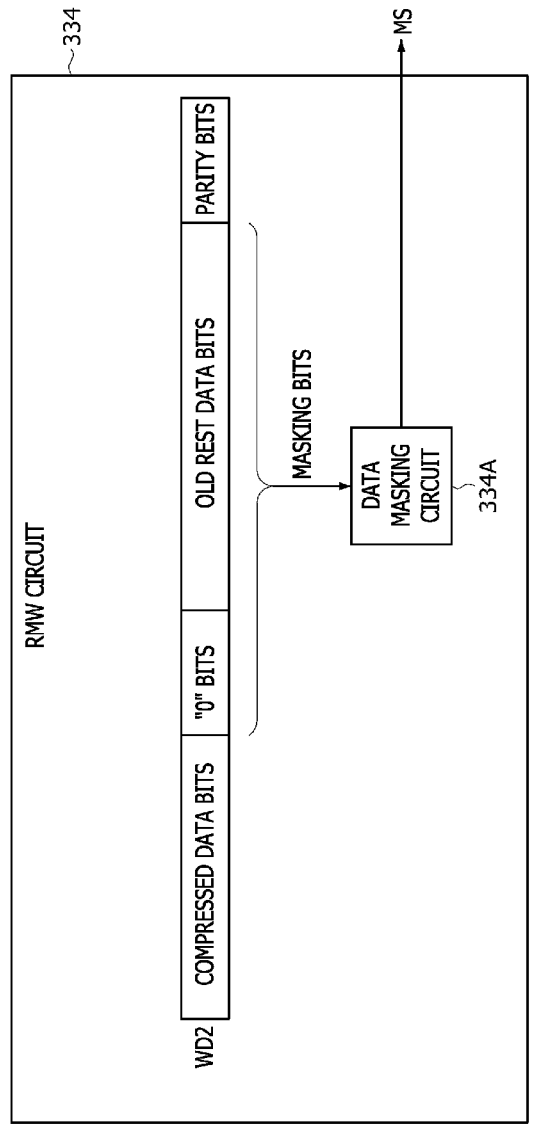
FIG. 11 is an example of a diagram illustrating a bit configuration of third write data generated in the read-modify-write (RMW) circuit included in the write control circuit of FIG. 9.

FIGS. 10 and 11 are diagrams illustrating operation of the RMW circuit 334 of the write control circuit 330 of FIG. 9. Specifically, FIG. 10 is a diagram illustrating bit configurations of the compressed data WD1_C and the first read data and parity data RD1+PD transmitted to the read-modify-write (RMW) circuit 334 included in the write control circuit of FIG. 9. In addition, FIG. 11 is a diagram illustrating a bit configuration of the third write data WD3 generated in the RMW circuit 334. In this embodiment, it is assumed that the first read data RD1 and the parity data PD from the phase-change memory device 100 have sizes of 128 bytes and 48 bytes, respectively. In addition, it is assumed that the size of the first write data WD1 and the compressed data WD1_C have sizes of 64 bytes and 48 bytes, respectively. In this case, the second write data WD2 output from the padding circuit 333 may include 48 bytes of the compressed data WD1_C and 16 bytes of data with value "0".

Referring to FIG. 10 first, the compressed data WD1_C transmitted from the multiplexer 332 to the RMW circuit 334 may be the same as the compressed data WD1_C output from the compression circuit 331. Accordingly, as described above with reference to FIG. 3, the compressed data WD1_C input to the RMW circuit 334 may be composed of compressed data bits of 48 bytes, and the rest bits of 16 bytes do not have values. The first read data and parity data RD1+PD input to the RMW circuit 334 may be composed of 48 bytes of old compressed data bits, 16 bytes of bits having a value "0", 64 bytes of old rest data bits, and 48 bytes of bits. The RMW circuit 334 may set the old compressed data bits of the first read data and parity data RD1+PD as replaced bits that are replaced with the compressed data bits of the compressed data WD1_C. Accordingly, the old compressed data bits of the first read data and parity data RD1+PD may be replaced with the compressed data bits of the compressed data WD1_C. The RMW circuit 334 may set bits of the first read data with value "0" and parity data RD1+PD and the old rest data bits as the masking bits.

Next, referring to FIG. 11, the second write data WD2 generated by the RMW circuit 334 may be composed of compressed data bits of the compressed data WD1_C, bits with value, "0", old rest data bits, and parity bits. Among the bits constituting the second write data WD1, the rest bits other than the compressed data bits have the same value as the first read data and parity data RD1+PD. However, in the case of the parity bits, the parity bits PD may be replaced with bits of new second parity data PD2 by ECC encoding in the ECC encoder (336 in FIG. 9). Thus, the bits with value "0" of 16 bytes constituting the first read data RD1 and old rest data bits of 64 bytes may constitute a part of the second write data WD2 without modifying values. Accordingly, the data masking circuit 334A may generate and output a masking signal MS designating the bits having value "0" of 16 bytes and old rest data bits of 64 bytes whose values are not modified among the bits of the second write data WD2. In an example, the write operation may not be performed on the bits designated by the masking signal MS in the phase-change memory device (100 in FIG. 1).

Figure 12:
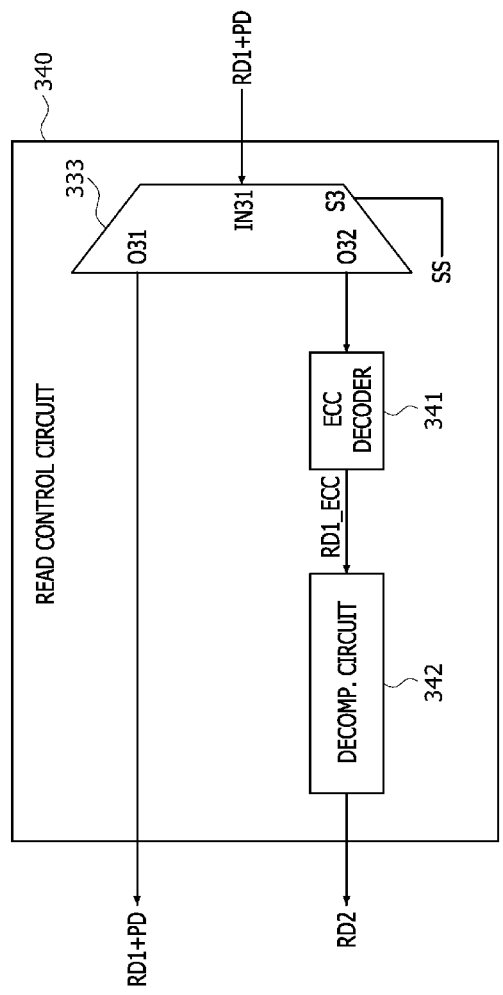
FIG. 12 is an example of a block diagram illustrating a read control circuit included in the phase-change memory controller of FIG. 8.

FIG. 12 is a block diagram illustrating the read control circuit 340 included in the phase-change memory controller 300 of FIG. 8.

Referring to FIG. 12, the read control circuit 340 may include an ECC decoder 341, a decompression circuit 342, and a multiplexer 332. The ECC decoder 341 and the decompression circuit 342 constituting the read control circuit 340 may be configured the same as the ECC decoder 241 and the decompression circuit 242 of the read control circuit 240 described above with reference to FIG. 5, respectively. Accordingly, descriptions of overlapping contents with those already described below will be omitted.

The multiplexer 332 may have a first input terminal IN31, a selection terminal S3, a first output terminal O31, and a second output terminal O32. The multiplexer 332 may receive the first read data and parity data RD1+PD from the phase-change memory device (100 of FIG. 1) through the input terminal IN31. The multiplexer 332 may receive the selection signal SS through the selection terminal S3. The multiplexer 332 may output the first read data and parity data RD1+PD through the first output terminal O31 or the second output terminal O32 depending on a logic level of the selection signal SS. The first output terminal O31 of the multiplexer 332 may be coupled to the RMW circuit (334 of FIG. 9) of the write control circuit (330 of FIG. 9). The second output terminal O32 of the multiplexer 332 may be coupled to the ECC decoder 341 of the read control circuit 340. When the selection signal SS is "1" (i.e., in a case of the RMW mode), the multiplexer 332 may output the first read data and parity data RD1+PD through the first output terminal O31. The first read data and parity data RD1+PD output through the first output terminal O31 of the multiplexer 332 may be transmitted to the RMW circuit (334 of FIG. 9) of the write control circuit (330 of FIG. 9). On the other hand, when the selection signal SS is "0" (i.e., in a case of the normal mode), the multiplexer 332 may output the first read data and parity data RD1+PD through the second output terminal O32.

While various embodiments have been described above, variations and improvements of the disclosed embodiments and other embodiments may be made based on what is described or illustrated in this document.

What is claimed is:

1. A phase-change memory controller configured to control a phase-change memory device, comprising a write control circuit configured to 1) receive first write data to be written to the phase-change memory device and having a first number of bits, the first number being a natural number greater than 2, and 2) generate second write data including compressed data obtained by compressing the first write data to a second number of bits, the second number being a natural number smaller than the first number, the second write data further including padding data that has a size corresponding to a difference between the first number and the second number, and the padding data having a predetermined value, and a read control circuit including a multiplexer, a decoder, and a decompression circuit, wherein the multiplexer is configured to receive the first read data and parity data from the phase-change memory device through an input terminal, and to output the first read data and the parity data to a first output terminal or a second output terminal, based on a selection signal transmitted through a selection terminal, wherein the decoder is configured to perform a decoding based on an error correction code on the first read data transmitted from the multiplexer, wherein a decompression circuit is configured to perform decompressing on the first read data and generate second read data, and wherein the first output terminal and the second output terminal of the multiplexer are coupled to the write control circuit and the decoder, respectively.

2. The phase-change memory controller of claim 1, further comprising:

a host interface configured to receive the first write data from an external device; and a write buffer in communication with the host interface and configured to receive the first write data from the host interface and transmit the first write data to the write control circuit.

3. The phase-change memory controller of claim 2, wherein the host interface includes a compute express link (CXL).

4. The phase-change memory controller of claim 1, wherein the write control circuit includes:

a compression circuit configured to compress the first write data and generate the compressed data; and a padding circuit configured to generate the padding data by writing remaining bits of the first write data with the predetermined value, the remaining bits corresponding to bits of the first write data except bits of the first write data that configures the compressed data.

5. The phase-change memory controller of claim 4, wherein the padding circuit is configured to output the second write data by adding the padding data to the compressed data.

6. The phase-change memory controller of claim 5, wherein the write control circuit further includes a read-modify-write (RMW) circuit configured to generate and output third write data in which some bits of read data are replaced with the bits of the compressed data, based on read data from the phase-change memory device and the compressed data.

7. The phase-change memory controller of claim 6, wherein the RMW circuit includes a data masking circuit outputting a masking signal indicating non-toggle bits among bits of the read data, based on the read data from the phase-change memory device and the compressed data.

8. The phase-change memory controller of claim 6, wherein the write control circuit further includes a multiplexer configured to receive the compressed data from the compression circuit through an input terminal, and to output the compressed data through a first output terminal or a second output terminal, based on a selection signal transmitted through a selection terminal.

9. The phase-change memory controller of claim 8, wherein the first output terminal and the second output terminal of the multiplexer are coupled to the padding circuit and the RMW circuit, respectively.

10. The phase-change memory controller of claim 8, wherein the multiplexer is configured to:

transmit the compressed data to the padding circuit through the first output terminal in response to the selection signal being at a logic level indicating a normal mode; and transmit the compressed data to the RMW circuit through the second output terminal in response to the selection signal being at a logic level indicating an RMW mode.

11. The phase-change memory controller of claim 6, wherein the write control circuit further includes a demultiplexer configured to receive the second write data output from the padding circuit through a first input terminal, to receive the third write data output from the RMW circuit through a second input terminal, and to output the second write data or the third write data through an output terminal, based on a selection signal transmitted through a selection terminal.

12. The phase-change memory controller of claim 11, wherein the demultiplexer is configured to:
output the second write data in response to the selection signal being at a logic level indicating a normal mode; and
output the third write data in response to the selection signal being at a logic level indicating a RMW mode.

13. The phase-change memory controller of claim 12, further comprising: an encoder configured to perform an encoding on the second write data or third write data based on an error correction code (ECC) and generate first parity data or second parity data, the encoder further configured to output the third write data and the second parity data in response to receiving the third write data transmitted from the demultiplexer.

14. The phase-change memory controller of claim 13, further comprising an output circuit configured to receive the second write data and the first parity data, or the third write data and the second parity data, from the encoder, and output the second write data and the first parity data, or the third write data and the second parity data, to the phase-change memory device,
wherein the output circuit is further configured to:
change an order of the compressed data, the padding data, and parity data hat is either the first parity data or the second parity data.

15. The phase-change memory controller of claim 1, further comprising:
a read buffer configured to receive the second read data from the read control circuit and store the second read data; and
a host interface configured to receive the second read data from the read buffer and transmit the second read data to an external device.

16. The phase-change memory controller of claim 1, wherein the multiplexer is configured to:
transmit the first read data and the parity data to the decoder through the first output terminal in response to the selection signal being at a logic level indicating a normal mode; and
transmit the first read data and the parity data to the write control circuit through the second output terminal in response to the selection signal being at a logic level indicating an RMW mode.

17. A phase-change memory system, comprising:
a phase-change memory device; and
a phase-change memory controller communicatively coupled with the phase-change memory device and configured to control the phase-change memory device,
wherein the phase-change memory controller includes;
a write control circuit configured to 1) receive first write data to be written to the phase-change memory device and having a first number of bits, the first number being a natural number greater than 2, and 2) generate second write data including compressed data obtained by compressing the first write data to a second number of bits, the second number being a natural number smaller than the first number, the second write data further including padding data that has a size corresponding to a difference between the first number and the second number, and the padding data having a predetermined value, and
a read control circuit including a multiplexer, a decoder, and a decompression circuit,
wherein the multiplexer is configured to receive the first read data and parity data from the phase-change memory device through an input terminal, and to output the first read data and the parity data to a first output terminal or a second output terminal, based on a selection signal transmitted through a selection terminal,
wherein the decoder is configured to perform a decoding based on an error correction code on the first read data transmitted from the multiplexer,
wherein a decompression circuit is configured to perform decompressing on the first read data and generate second read data, and
wherein the first output terminal and the second output terminal of the multiplexer are coupled to the write control circuit and the decoder, respectively.

18. The phase-change memory system of claim 17, further comprising:
a host interface configured to receive the first write data from an external device; and
a write buffer in communication with the host interface and configured to receive the first write data from the host interface and transmit the first write data to the write control circuit.

19. The phase-change memory system of claim 17, wherein the write control circuit includes:
a compression circuit configured to compress the first write data and generate the compressed data; and
a padding circuit configured to generate the padding data by writing remaining bits of the first write data with the predetermined value, the remaining bits corresponding to bits of the first write data except bits of the first write data that configures the compressed data.

\* \* \* \* \*